US010288854B2

(12) United States Patent
Tung et al.

(10) Patent No.: US 10,288,854 B2
(45) Date of Patent: May 14, 2019

(54) ATHERMAL COMPOUND LENS

(71) Applicant: OmniVision Technologies, Inc., Santa Clara, CA (US)

(72) Inventors: Wei Lin Tung, Sanyi Township (TW); Jau-Jan Deng, Taipei (TW)

(73) Assignee: OmniVision Technologies, Inc., Santa Clara, CA (US)

(\*) Notice: Subject to any disclaimer, the term of this patent is extended or adjusted under 35 U.S.C. 154(b) by 169 days.

(21) Appl. No.: 15/365,418

(22) Filed: Nov. 30, 2016

(65) Prior Publication Data

US 2018/0149843 A1 May 31, 2018

(51) Int. Cl.
*G02B 5/00* (2006.01)
*G02B 13/14* (2006.01)

(52) U.S. Cl.
CPC ............ *G02B 13/14* (2013.01); *G02B 5/005* (2013.01)

(58) Field of Classification Search
CPC . G02B 13/003–13/0045; G02B 13/008; G02B 13/14; G02B 5/005; G02B 7/028; G02B 27/028; G02B 9/04–9/64
USPC ................................................ 359/355–357
See application file for complete search history.

(56) References Cited

U.S. PATENT DOCUMENTS

| 5,737,120 A | 4/1998 | Arriola |
| 2010/0046096 A1* | 2/2010 | Hirao .................... B82Y 20/00 359/795 |
| 2011/0007195 A1 | 1/2011 | Fukuta |
| 2012/0050879 A1* | 3/2012 | Kathman ......... B29D 11/00298 359/652 |
| 2013/0050839 A1 | 2/2013 | Oskotsky et al. |

(Continued)

OTHER PUBLICATIONS

II-VI Infrared, "Infrared Materials: Zinc Selenide, Zinc Sulfide, Zinc Sulfide MultiSpectral", published 2009, accessed online Aug. 16, 2018, http://www.iiviinfrared.com/pdfs/II-VI_InfraredMaterials2009-04a.pdf.*
U.S. Appl. No. 15/273,051, Non-Final Rejection dated Apr. 2, 2018, 15 pp.

(Continued)

*Primary Examiner* — Stephone B Allen
*Assistant Examiner* — Adam W Booher
(74) *Attorney, Agent, or Firm* — Lathrop Gage LLP

(57) ABSTRACT

An athermal compound lens includes a plano-concave lens and a plano-convex lens. The plano-concave lens has a first focal length, a first refractive index $n_1$, and planar object-side surface opposite a concave image-side surface. The plano-convex lens is axially aligned with the plano-concave lens and has (i) a second focal length, (ii) a second refractive index $n_2$, (iii) a planar image-side surface, and (iv) a convex object-side surface between the planar image-side surface and the concave image-side surface. In a free-space wavelength range and temperature range: (a) the first focal length divided by the second focal length is less than −0.68, and (b)

(Continued)

first and second refractive indices $n_1$ and $n_2$ have respective temperature dependences $$\frac{\Delta n_1}{\Delta T} \text{ and } \frac{\Delta n_2}{\Delta T}$$

that satisfy $$\left(\frac{\Delta n_1}{\Delta T}\right) \bigg/ \left(\frac{\Delta n_2}{\Delta T}\right) \geq 2.$$

12 Claims, 9 Drawing Sheets

(56) References Cited

U.S. PATENT DOCUMENTS

| | | | |
|---|---|---|---|
| 2013/0050840 | A1 | 2/2013 | Oskotsky et al. |
| 2013/0278999 | A1* | 10/2013 | Carlie .............. C03C 3/32 359/356 |
| 2014/0376106 | A1 | 12/2014 | Oskotsky et al. |

OTHER PUBLICATIONS

Taiwan Patent Application No. 107106436, English translation of Office Action dated Jan. 30, 2019, 3 pages.

\* cited by examiner

| substrate/ surface | radius $r_c$ (mm) | thickness (mm) | refractive index | Abbe number | minimum diameter (mm) | conic $k$ | aspheric coefficient | | | | | |
|---|---|---|---|---|---|---|---|---|---|---|---|---|
| | | | | | | | 4th-order term $a_4$ | 6th-order term $a_6$ | 8th-order term $a_8$ | 10th-order term $a_{10}$ | 12th-order term $a_{12}$ | 14th-order term $a_{14}$ |
| 210 | ∞ | 0.3000 | 1.517 | 63.00 | 1.0900 | | | | | | | |
| 221(1) | ∞ | 0.0200 | 1.511 | 57.00 | 0.7355 | | | | | | | |
| 222(1) | 0.2350 | 0.1814 | | | 0.5325 | -0.6821 | 3.00 | -3.220E+02 | 7.865E+03 | 9.611E+04 | 4.344E+05 | 0 |
| 231(1) | 0.3740 | 0.0928 | 1.590 | 31.00 | 0.4570 | -0.5750 | 0.4280 | -1.84E+02 | 9.02E+03 | -1.93E+05 | 1.44E+06 | 0 |
| 232(1) | ∞ | 0 | | | 0.4351 | | | | | | | |
| 342 | ∞ | 0.2500 | 1.517 | 63.0 | 0.1920 | | | | | | | |
| STOP 343 | ∞ | 0 | | | 0.1920 | | | | | | | |
| 344 | ∞ | 0.2550 | 1.517 | 63.0 | 0.1920 | | | | | | | |
| 251(1) | 1.9091 | 0.1008 | 1.511 | 57.0 | 0.4469 | | | | | | | |
| 252(1) | -0.3227 | 0.0500 | | | 0.4667 | -1.0648 | -2.8303 | 5.547E+02 | -3.231E+04 | 8.783E+05 | -1.113E+07 | 5.301E+07 |
| 361 | ∞ | 0.4050 | 1.517 | 63.0 | 0.5766 | | | | | | | |
| 371 | ∞ | 0.4000 | 1.517 | 63.0 | 0.7903 | | | | | | | |
| 372 | ∞ | 0.0450 | | | | | | | | | | |
| 278(1) | ∞ | 0 | | | | | | | | | | |

FIG. 4

ATHERMAL COMPOUND LENS

BACKGROUND

Camera modules designed to capture images of objects that emit near-infrared (near-IR) light are used in automotive applications and endoscopy. For example, FIG. 1 depicts a lesion 190 in the field of view of an endoscope 110. A camera module 120 images lesion 190, which is located with respect to a coordinate system 198 that has directions x, y, and z. Camera module 120 includes an image sensor 130 and an imaging lens 100. Image sensor 130 includes a pixel array 132 upon which imaging lens 100 forms an image of lesion 190. Pixel array 132 has a width 132W and imaging lens 100 has an optical axis 100X.

Effectiveness of endoscope 110 depends on its ability to meet performance specifications at a wavelength and temperature range characteristic of its application. A wavelength range is, for example, the visible wavelength range (free-space wavelength $\lambda_0 \in [0.40\ \mu m,\ 0.65\ \mu m]$) or the near infrared wavelength range ($\lambda_0 \in [0.60\ \mu m,\ 1.0\ \mu m]$). A typical temperature range for the aforementioned applications is 20° C. to 60° C. Hence, the performance of a camera that includes lens 100 depends in part on imaging lens 100 being athermalized such that it forms a clear image on image sensor 132 within the temperature range associated with its application. For example, imaging lens 100 images light 192 propagating from a point 190P on lesion 190 to a point 102. Light 192 is for example near-IR light. Point 102 is located a field height $x_1$ from optical axis 100X and a focal shift $\Delta z_1$ from pixel array 132. Focal shift $\Delta z_1 = 0$ corresponds to when imaging lens 100 forms an in-focus image of point 190P on image sensor 132. The magnitude of focal shift $\Delta z_1$ as a function of field height $x_1$ and ambient temperature T is an athermalization metric for lens 100. For a prior-art lens, at visible and near-IR wavelengths the on-axis focal length shifts by $\Delta z_1 = 9.2\ \mu m$ between 20° C. and 60° C., or $$\frac{\Delta z_1}{\Delta T} = 0.23\ \mu m/°\ C.$$

SUMMARY OF THE EMBODIMENTS

Embodiments of the systems and methods disclosed herein provide an athermal compound lens system. Embodiments of the athermal compound lens herein may be suitable for the above-mentioned endoscopic imaging application, as well as any other application with athermal imaging requirements.

In an embodiment, an athermal compound lens includes a plano-concave lens and a plano-convex lens. The plano-concave lens has a first focal length, a first refractive index $n_1$, and planar object-side surface opposite a concave image-side surface. The plano-convex lens is axially aligned with the plano-concave lens and has (i) a second focal length, (ii) a second refractive index $n_2$, (iii) a planar image-side surface, and (iv) a convex object-side surface between the planar image-side surface and the concave image-side surface. In a free-space wavelength range and temperature range: (a) the first focal length divided by the second focal length is less than −0.68, and (b) first and second refractive indices $n_1$ and $n_2$ have respective temperature dependences $\frac{\Delta n_1}{\Delta T}$ and $\frac{\Delta n_2}{\Delta T}$ that satisfy $$\left(\frac{\Delta n_1}{\Delta T}\right) / \left(\frac{\Delta n_2}{\Delta T}\right) \geq 2.$$

BRIEF DESCRIPTION OF THE FIGURES

FIG. 4 shows a table of exemplary parameters of the athermal compound lens of FIG. 3.

DETAILED DESCRIPTION OF THE EMBODIMENTS

Figure 1:
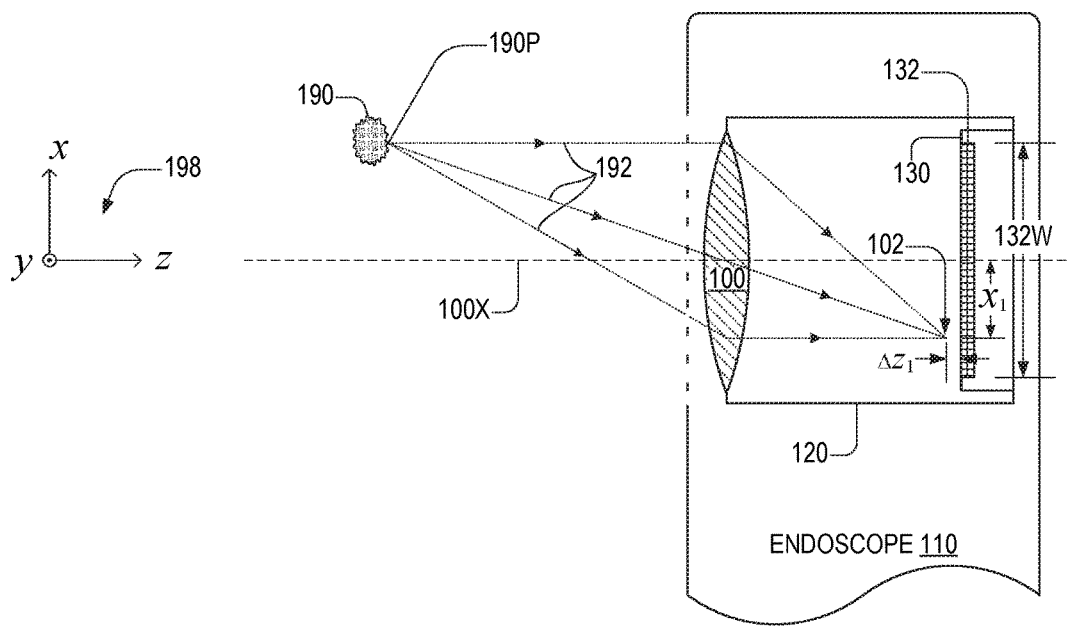
FIG. 1 depicts a prior art endoscope with a camera module that includes an imaging lens.
Figure 2:
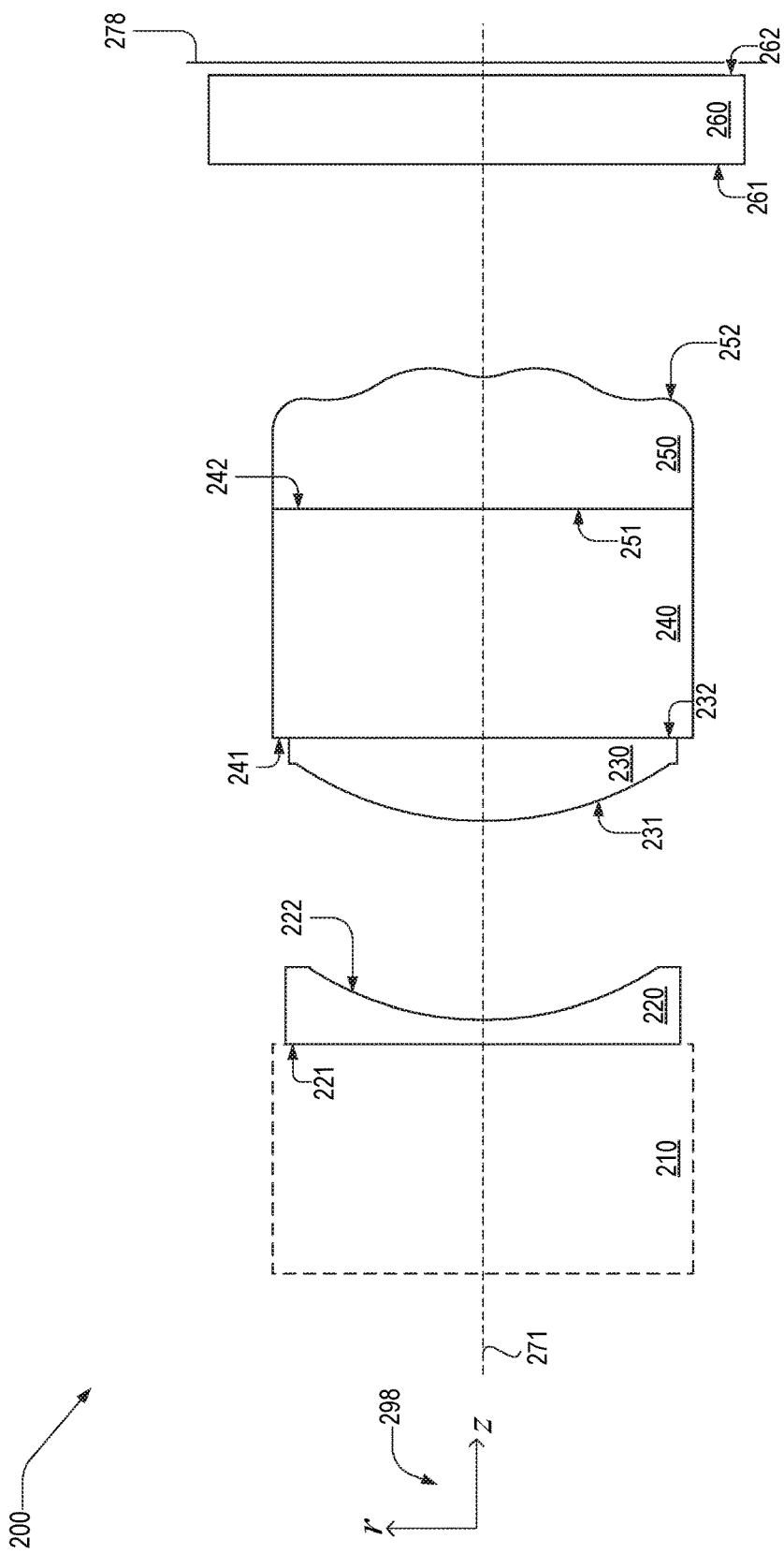
FIG. 2 is a cross-sectional view of an athermal compound lens, which is compatible for use the camera module of FIG. 1, in an embodiment.

FIG. 2 is a cross-sectional view of an athermal compound lens 200, which is compatible for use in camera module 120 in place of lens 100. Athermal compound lens 200 includes a plano-concave lens 220, a plano-convex lens 230, a substrate 240, and an image-side lens 250, which have a common optical axis 271. Lens 220 has an object-side surface 221 and an image-side surface 222. Athermal compound lens may include a substrate 210 that supports lens 220. Lens 230 has an object-side surface 231 and an image-side surface 232. Substrate 240 has an object-side surface 241, which supports lens 230, and an image-side surface 242, which supports lens 250. Substrate 240 may be either monolithic or formed of multiple attached substrates. Image-side lens has an object-side surface 251 and an image-side surface 252, which includes at least one of a concave region and a convex region.

Athermal compound lens 200 also may include a cover glass 260. When included in athermal compound lens 200 or an imaging system therewith, cover glass 260 covers a pixel array of an image sensor (not shown) located at an image plane 278. Cover glass 260 has a front surface 261 and a back surface 262. The specific type of pixel array and image sensor may vary and is thus not discussed in detail herein.

In an embodiment, at least part of the manufacturing of athermal compound lens 200 is performed at the wafer-level using a wafer-level optics replication process. In this embodiment, lenses 230 and 250 are molded on substrate 240 and, when the embodiment includes substrate 210, lens 220 is molded thereon. Wafer-level replication processes enable lenses 230 and 250 to be formed of materials with different respective refractive indices, which enables greater flexibility in designing athermal compound lens 200 to minimize focal shift $\Delta z_1$.

The cross section of elements of athermal compound lens 200 may be rectangular or square. For example, if produced via wafer-level optics replication, each of lenses 230 and 250 and substrate 240 may have the same square cross section resulting from a dicing operation performed after molding lenses 230 and 250 on substrate 240.

Lenses 220, 230, and 250 may be formed of a solder-reflow compatible material via a wafer-level optics replication process. A solder-reflow compatible material for example withstands surface-mount technology (SMT) reflow soldering processes occurring at temperatures exceeding 250° C. Examples of such material include NT-UV Series UV-curing resins by Nitto Denko Corporation (Osaka, Japan). It should be appreciated that additional or alternative materials may be used without departing from the scope hereof.

Lenses 220, 230, and 250 may also be formed via injection molding or other methods known in the art. Alternatively, lenses 220, 230, and 250 may be formed of glass via precision glass molding (also known as ultra-precision glass pressing) or other methods known in the art.

While each of lenses 220, 230, and 250 is illustrated as a singlet lens in FIG. 2, at least one of lenses 220, 230, and 250 may be a non-singlet lens without departing from the scope hereof.

Athermal compound lens 200 satisfies the following limitations, which enable it to have an athermalization metric $\Delta z_1/\Delta T < 0.15$ μm/° C. at temperatures between 20° C. and 60° C. Herein, temperature ranges such as $\Delta T$ have units of degrees Celsius, or equivalently degrees Kelvin. The following limitations are satisfied at free-space wavelengths in a wavelength range including at least one of the visible and near-IR wavelength range.

Lenses 220 and 230 have respective focal lengths $f_{220}$ and $f_{230}$, which satisfy $f_{220}/f_{230} < -0.68$. Lenses 220 and 230 have respective refractive indices $n_2$ and $n_3$, which satisfy $n_3 \geq n_2$ for enabling the athermalization metric while maintaining sufficient image equality. Refractive indices $n_2$ and $n_3$ have respective temperature dependences $$\frac{\Delta n_2}{\Delta T} \text{ and } \frac{\Delta n_3}{\Delta T}$$

that satisfy $$\left(\frac{\Delta n_2}{\Delta T}\right) / \left(\frac{\Delta n_3}{\Delta T}\right) \geq 2.$$

For example, $$\frac{\Delta n_2}{\Delta T} = 10^{-4}/° C. \text{ and } \frac{\Delta n_3}{\Delta T} = 0.5 \times 10^{-4}/° C.$$

Athermal Compound Lens, Example 1

Figure 3:
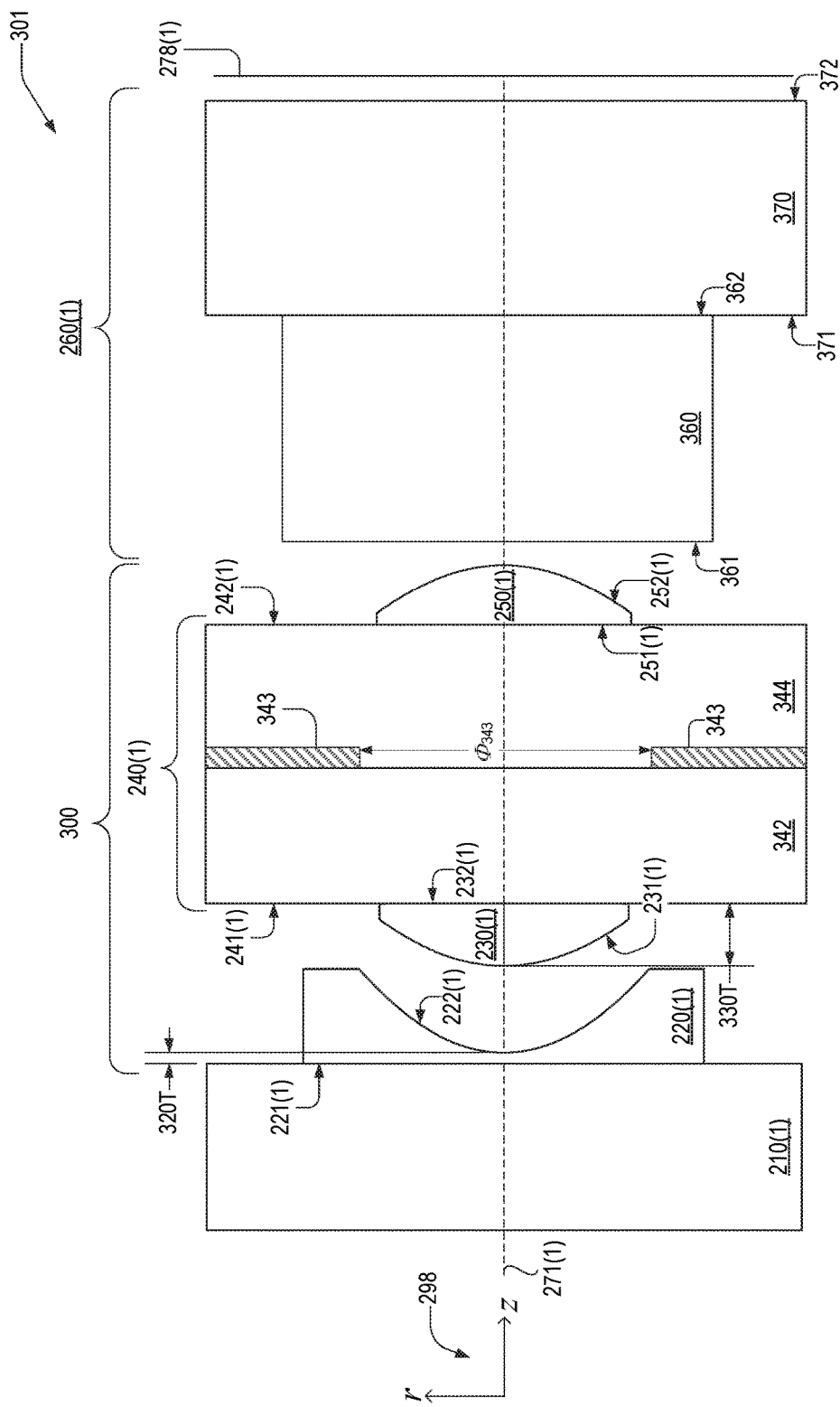
FIG. 3 is a cross-sectional view of an imaging system that includes a first embodiment of the athermal compound lens of FIG. 2.

FIG. 3 is a cross-sectional view of an athermal compound lens 300 in an imaging system 301. Athermal compound lens is an embodiment of athermal compound lens 200. Imaging system 301 also includes cover glass 260(1) between athermal compound lens 300 and an image plane 278(1). Athermal compound lens 300 has a full-angle field of view of $2\phi_1 = 110°$ and a working f-number $N_w = 3.3$.

Athermal compound lens 300 includes a plano-concave lens 220(1), a plano-convex lens 230(1), an image-side lens 250(1), and substrates 210(1), 240(1), 360, and 370. Substrates 360 and 370 have respective object-side surfaces 361 and 371, and respective image-side surfaces 362 and 372. Surfaces 362 and 371 are adjoining; as such, substrates 360 and 370 are denoted herein as cover glass 260(1). Image-side lens 250(1) is plano-convex. Substrate 240(1) includes substrates 342 and 344, and an aperture stop 343 therebetween. Herein, a figure element denoted by a reference numeral suffixed by a parenthetical numeral indicates an example of the element indicated by the reference numeral. For example, lens 220(1) is an example of lens 220.

FIG. 4 shows a table 400 of exemplary parameters of surfaces and substrates of athermal compound lens 300. Table 400 includes columns 404, 406, 408, 410, 412, 414 and 421-427. Column 421 denotes substrates 210, 342, and 344, surfaces 221(1), 222(1), 231(1), 232(1), 251(1), 252(1), 361, 371, and 372, aperture stop 343, and image plane 278(1). Column 423 includes thickness values, in millimeters, between adjacent surfaces of athermal compound lens 300 on optical axis 271(1). Column 423 includes center thicknesses of substrates 210(1), 342, 344, 360, 370, and lenses 220(1), 230(1), and 250(1). A thickness value in column 423 in a row denoting a specific surface indicates the on-axis distance between that specific surface and the next surface. For example, on optical axis 271(1), surfaces 221(1) and 222(1) are separated by 0.020 mm, which corresponds to a thickness 320T of lens 220(1). On optical axis 271(1), surfaces 231(1) and 232(1) are separated by 0.0928 mm, which corresponds to a thickness 330T of lens 230(1).

Column 426 indicates the minimum diameter of each surface sufficient for a ray incident on substrate 210(1) that passes through aperture stop 343 to also pass through that surface. Aperture stop 343 has a diameter $\varnothing_{343} = 0.192$ mm. It should be appreciated that imaging system 301 need not include cover glass 260(1), in which case image plane 278(1) shifts toward athermal compound lens 300.

Surfaces 222(1), 231(1), and 252(1) are defined by surface sag $z_{sag}$, shown in Eqn. 1.

$$z_{sag} = \frac{cr^2}{1 + \sqrt{1-(1+k)c^2r^2}} + \sum_{i=2}^{N} \alpha_{2i} r^{2i} \quad (1)$$

In Eqn. 1, $z_{sag}$ is a function of radial coordinate r, where directions z and r are shown in a coordinate system 298 of FIG. 2. Quantity i is a positive integer and N=7. In Eqn. 1, the parameter c is the reciprocal of the surface radius of curvature $r_c$:

$$c = \frac{1}{r_c}.$$

Column 422 of Table 400 lists $r_c$ values for surfaces 222(1), 231(1), and 252(1). Parameter k denotes the conic constant, shown in column 427. Columns 404, 406, 408, 410, 412, and 414 contain values of aspheric coefficients $\alpha_4$, $\alpha_6$, $\alpha_8$, $\alpha_{10}$, $\alpha_{12}$, and $\alpha_{14}$ respectively. The units of quantities in table 400 are consistent with $z_{sag}$ in Eqn. 1 being expressed in millimeters.

Column 424 lists values of material refractive index $n_d$ at free-space wavelength $\lambda_0=587.5$ nm (at temperature $T_1$), and column 425 lists the corresponding Abbe numbers $V_d$. The refractive index and Abbe number values corresponding to a surface characterize the material between the surface and the surface in the row beneath. For example, the refractive index and Abbe number between surface 221(1) and 222(1) are 1.511 and 57.0, respectively.

Table 1 shows the refractive index n and focal lengths f of lenses 220(1) and 230(1). Focal lengths f are approximated using the lensmaker's equation and lens parameters of table 400 ($\lambda_0=587.5$ nm, T=20° C.). The ratio of the focal lengths of lens 220(1) to that of lens 230(1) is −0.73 at 587.5 nm and −0.72 at 850 nm.

TABLE 1

| lens | $\lambda_0$/nm | n, 20° C. | n, 40° C. | n, 60° C. | f/mm |
|---|---|---|---|---|---|
| 220(1) | 587 | 1.511 | 1.507 | 1.503 | −0.460 |
|  | 850 | 1.504 | 1.500 | 1.496 | −0.466 |
| 230(1) | 587 | 1.590 | 1.588 | 1.586 | +0.634 |
|  | 850 | 1.575 | 1.573 | 1.571 | +0.650 |

Figure 5A:
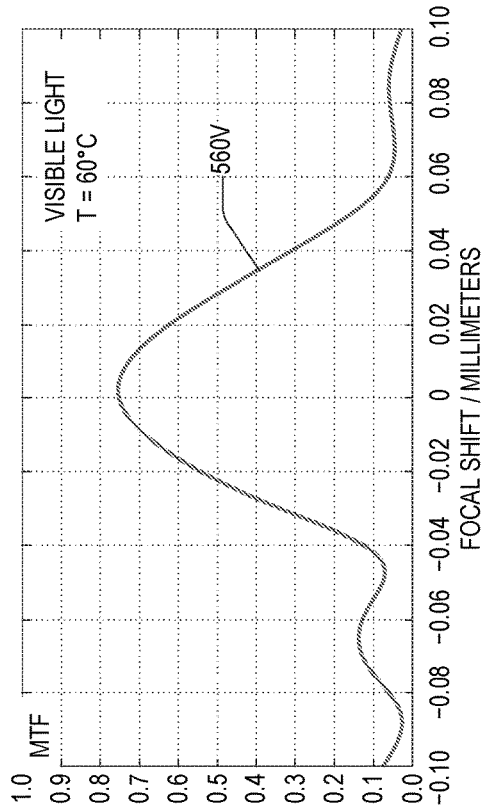
FIGS. 5A, 5B, 5C, and 5D are exemplary plots of the through-focus modulation transfer function (MTF) of the athermal compound lens of FIG. 3 at different respective temperatures.
Figure 5B:
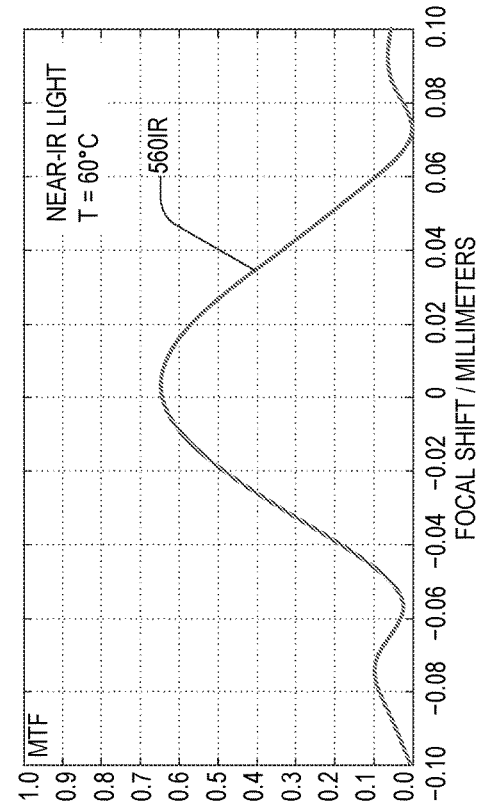

FIGS. 5A and 5B are plots of respective on-axis through-focus polychromatic MTF curves 520V and 560V of athermal compound lens 300 at temperatures $T_1=20°$ C. and $T_2=60°$ C., respectively. MTF curves 520V and 560V are each average MTF between 420 nm and 640 nm at 95 cycles/mm. The focal shift is referenced to focal plane location at temperature $T_1$, such that MTF curve 520V has a maximum value at focal shift $\Delta z_1=0$. A comparison of the peaks of MTF curves 520V and 560V shows that, between temperatures $T_1$ and $T_2$, the on-axis focal length shifts by $\Delta z_1=1.9$ µm, or $$\frac{\Delta z_1}{\Delta T} = 0.05 \; \mu m/° C.$$

Figure 5C:
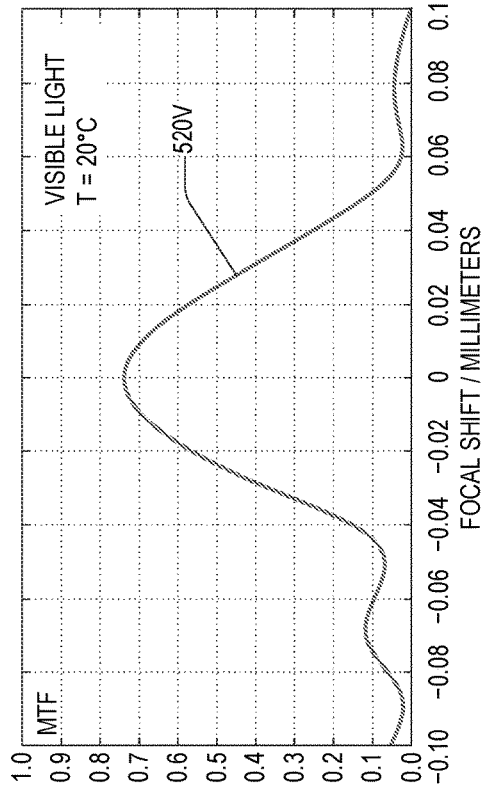
Figure 5D:
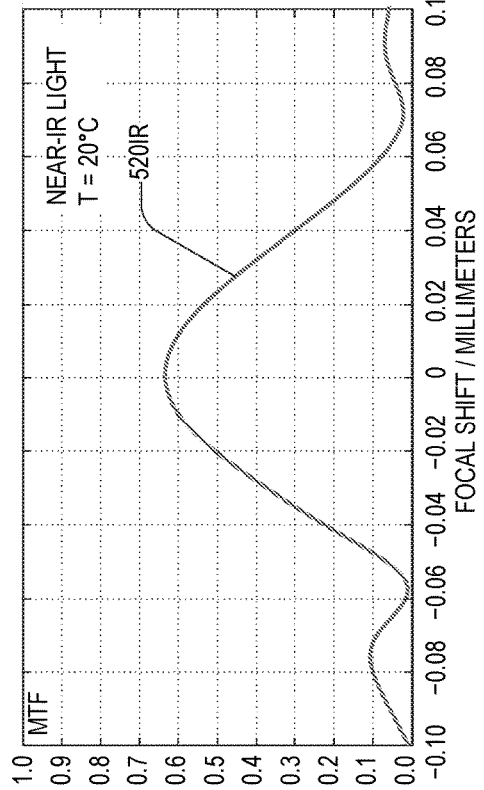

FIGS. 5C and 5D are plots of respective on-axis through-focus polychromatic MTF curves 520IR and 560IR of athermal compound lens 300 at temperatures $T_1$ and $T_2$, respectively. MTF curves 520IR and 560IR are each average MTF between 830 nm and 870 nm at 95 cycles/mm. The focal shift is referenced to focal plane location at temperature $T_1$, such that MTF curve 520IR has a maximum value at focal shift $\Delta z_1=0$. A comparison of the peaks of MTF curves 520IR and 560IR shows that, between temperatures $T_1$ and $T_2$, the on-axis focal length shifts by $\Delta z_1=3.5$ µm, or $$\frac{\Delta z_1}{\Delta T} = 0.09 \; \mu m/° C.$$

Athermal Compound Lens, Example 2

Figure 6:
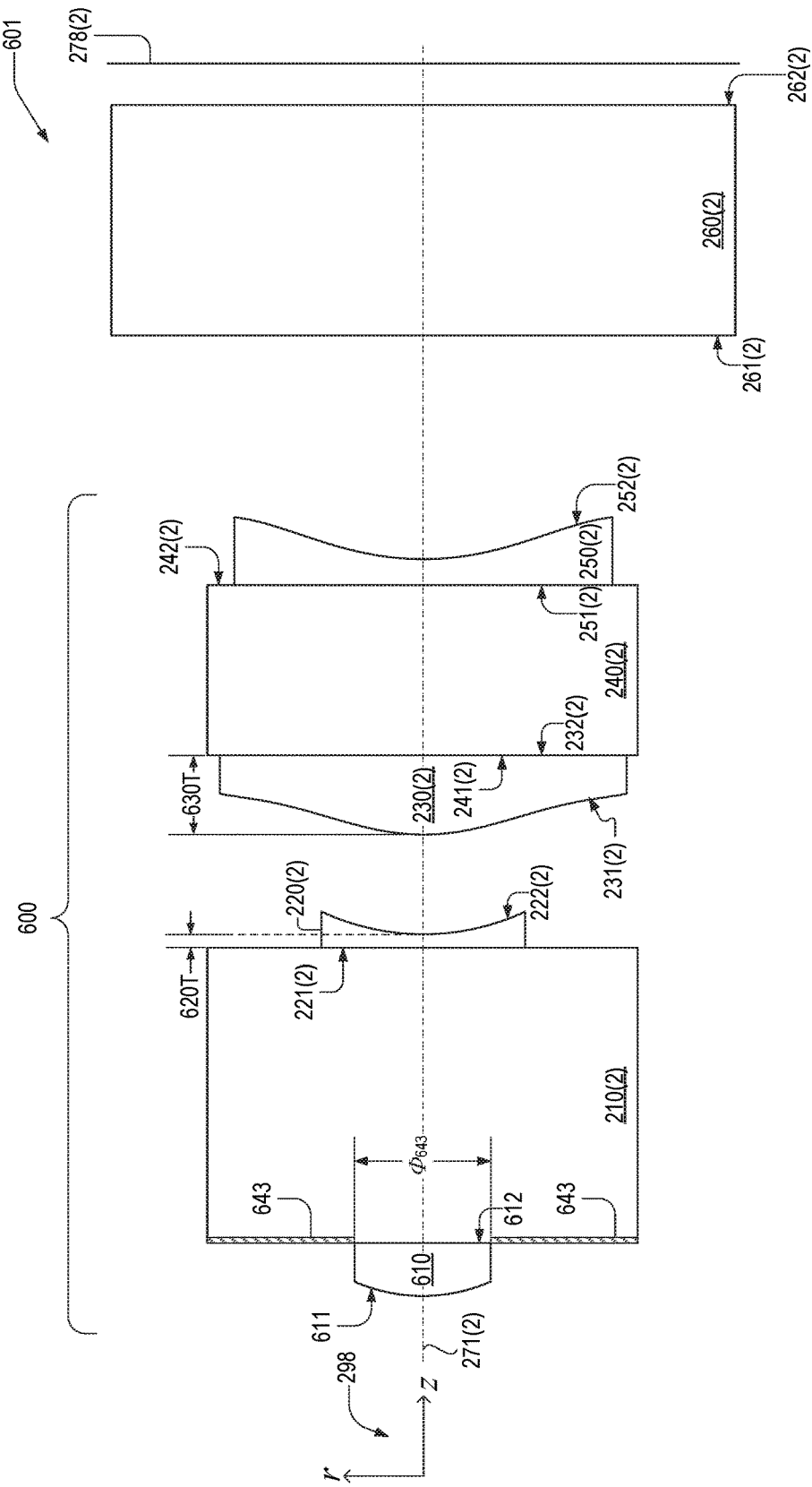
FIG. 6 is a cross-sectional view of an imaging system that includes a second embodiment of the athermal compound lens of FIG. 2.

FIG. 6 is a cross-sectional view of an athermal compound lens 600 in an imaging system 601. Imaging system 601 may be part of an automotive application such as a gesture-recognition system. Athermal compound lens is an embodiment of athermal compound lens 200. Imaging system 601 also includes cover glass 260(2) between athermal compound lens 600 and an image plane 278(2). Athermal compound lens 600 has a full-angle field of view of $2\phi_1=50.6°$ and a working f-number $N_w=5.3$.

Athermal compound lens 600 includes a plano-convex lens 610, a plano-concave lens 220(2), a plano-convex lens 230(2), an image-side lens 250(2), and substrates 210(2), 240(2), and 260(2). Image-side lens 250(2) is plano-concave. Plano-convex lens 610 has an object-side surface 611 and an image-side surface 612, which corresponds to an axial location of an aperture stop 643 of athermal compound lens 600.

Figure 7:
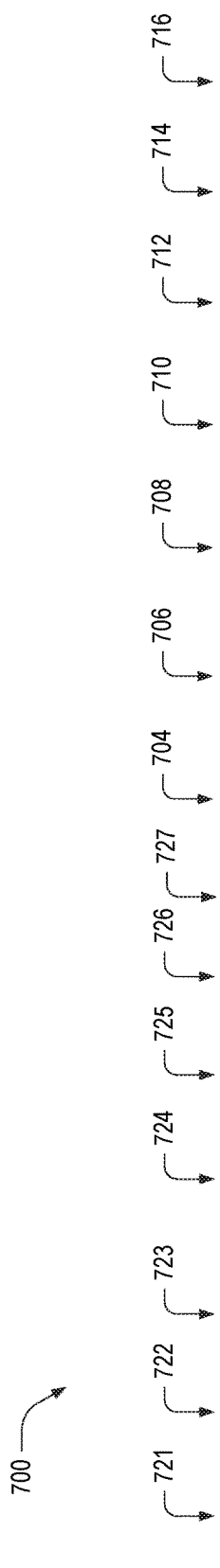
FIG. 7 shows a table of exemplary parameters of the athermal compound lens of FIG. 6.

FIG. 7 shows a table 700 of exemplary parameters of surfaces and substrates of athermal compound lens 600. Table 700 includes columns 704, 706, 708, 710, 712, 714, 716, and 721-727. Column 721 denotes substrates 210(2), 240(2), and 260(2), surfaces 611, 612, 221(2), 222(2), 231(2), 232(2), 251(2), 252(2), 261(2), 262(2), aperture stop 643, and image plane 278(2). Column 723 includes thickness values, in millimeters, between adjacent surfaces of athermal compound lens 600 on optical axis 271(2). Column 723 includes center thicknesses of substrates 210(2), 240(2), cover glass 260(2), and lenses 610, 220(2), 230(2), and 250(2). A thickness value in column 723 in a row denoting a specific surface indicates the on-axis distance between that specific surface and the next surface. For example, on optical axis 271(2), surfaces 221(2) and 222(2) are separated by 0.02 mm, which corresponds to a thickness 620T of lens 220(2). On optical axis 271(2), surfaces 231(2) and 232(2) are separated by 0.0928 mm, which corresponds to a thickness 630T of lens 230(2).

Column 726 indicates the minimum diameter of each surface sufficient for a ray incident on substrate 210(2) that passes through aperture stop 643 to also pass through that surface. Aperture stop 643 has a diameter $\varnothing_{643}=0.32$ mm. It should be appreciated that imaging system 601 need not include cover glass 260(2), in which case image plane 278(2) shifts toward athermal compound lens 600.

Surfaces 222(2), 231(2), and 252(2) are defined by surface sag $z_{sag}$, shown in Eqn. 1. Column 722 of Table 700 lists $r_c$ values for surfaces 222(2), 231(2), and 252(2). Parameter k denotes the conic constant, shown in column 727. Columns 704, 706, 708, 710, 712, 714, and 716 contain values of aspheric coefficients $\alpha_4$, $\alpha_6$, $\alpha_8$, $\alpha_{10}$, $\alpha_{12}$, $\alpha_{14}$, and $\alpha_{16}$ respectively. The units of quantities in table 700 are consistent with $z_{sag}$ in Eqn. 1 being expressed in millimeters.

Column 724 lists values of material refractive index $n_d$ at free-space wavelength $\lambda_0=587.5$ nm, and column 725 lists the corresponding Abbe numbers $V_d$. Table 2 shows the refractive index n at $\lambda_0=587.5$ nm and focal lengths f of lenses 610, 220(2), 230(2), and 250(2). Focal lengths f are approximated using the lensmaker's equation and lens parameters of table 700 ($\lambda_0=587.5$ nm, T=20° C.). The ratio of the focal lengths of lens 220(2) to that of lens 230(2) is −0.965 at both $\lambda_0=587.5$ nm and $\lambda_0=850$ nm.

TABLE 2

| lens | $\lambda_0$/nm | n, 20° C. | n, 40° C. | n, 60° C. | f/mm |
|---|---|---|---|---|---|
| 220(2) | 587 | 1.520 | 1.516 | 1.511 | −1.880 |
|  | 850 | 1.513 | 1.508 | 1.504 | −1.906 |
| 230(2) | 587 | 1.520 | 1.518 | 1.516 | +1.949 |
|  | 850 | 1.513 | 1.511 | 1.509 | +1.975 |

Figure 8A:
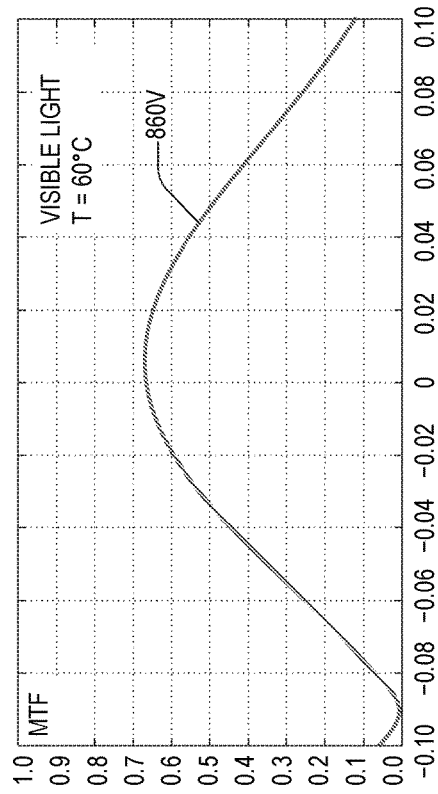
FIGS. 8A, 8B, 8C, and 8D are exemplary plots of the through-focus MTF of the athermal compound lens of FIG. 10 at different respective temperatures.
Figure 8B:
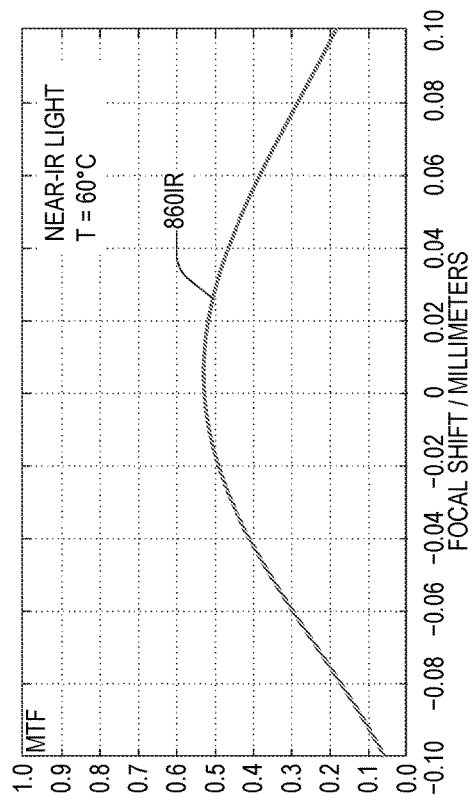

FIGS. 8A and 8B are plots of respective on-axis through-focus polychromatic MTF curves 820V and 860V of athermal compound lens 600 at temperatures $T_1=20°$ C. and $T_2=60°$ C., respectively. MTF curves 820V and 860V are each average MTF between 420 nm and 640 nm at 95 cycles/mm. The focal shift is referenced to focal plane location at temperature $T_1$, such that MTF curve 820V has a maximum value at focal shift $\Delta z_1 = 0$. A comparison of the peaks of MTF curves 820V and 860V shows that, between temperatures $T_1$ and $T_2$, the on-axis focal length shifts by $\Delta z_1 = 5.6$ µm, or $$\frac{\Delta z_1}{\Delta T} = 0.14 \; \mu m/°\; C.$$

Figure 8C:
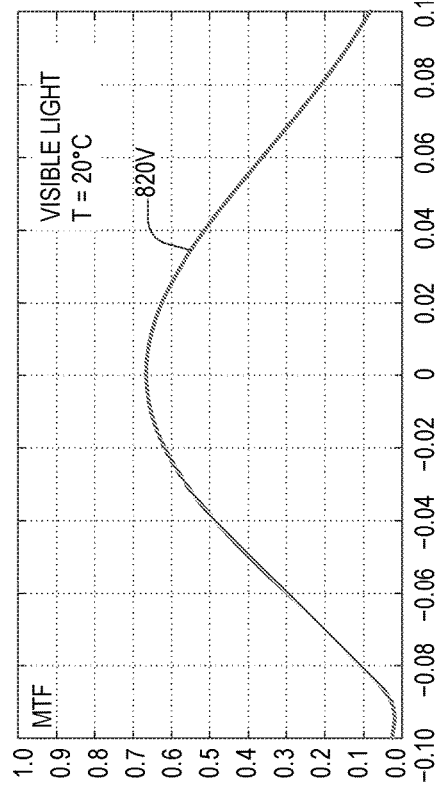
Figure 8D:
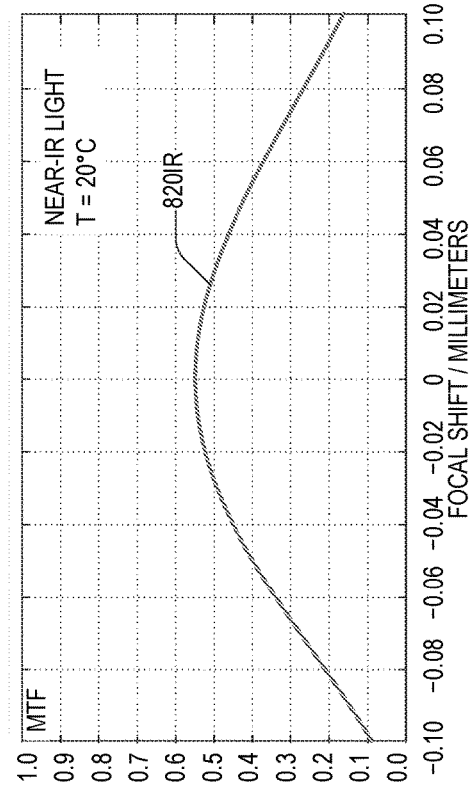

FIGS. 8C and 8D are plots of respective on-axis through-focus polychromatic MTF curves 820IR and 860IR of athermal compound lens 300 at temperatures $T_1$ and $T_2$, respectively. MTF curves 820IR and 860IR are each average MTF between 830 nm and 870 nm at 95 cycles/mm. The focal shift is referenced to focal plane location at temperature $T_1$, such that MTF curve 820IR has a maximum value at focal shift $\Delta z_1 = 0$. A comparison of the peaks of MTF curves 820IR and 860IR shows that, between temperatures $T_1$ and $T_2$, the on-axis focal length shifts by $\Delta z_1 = 5.6$ µm, or $$\frac{\Delta z_1}{\Delta T} = 0.14 \; \mu m/°\; C.$$

Figure 9:
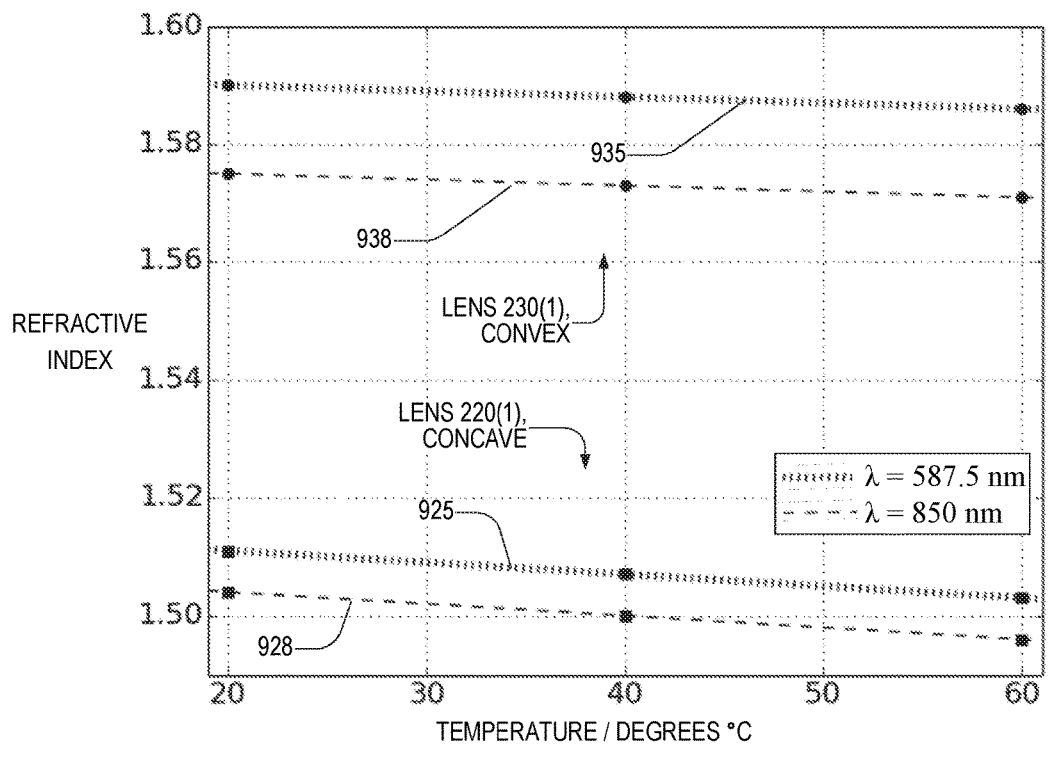
FIG. 9 is a graph showing the refractive-index temperature dependence of two lenses of the lens of FIG. 3.

FIG. 9 is a graph of the refractive indices of lenses 220(1) and 230(1), of athermal compound lens 300, shown in Table 1 fit with linear temperature dependencies 925, 928, 935, and 938. Linear temperature dependencies 925 and 928 correspond to concave lens 220(1) at $\lambda_0=587$ and $\lambda_0=850$ nm, respectively, and each have a slope $-2.0 \times 10^{-4}/°$ C. Linear temperature dependencies 935 and 938 correspond to convex lens 220(1) at $\lambda_0=587$ and $\lambda_0=850$ nm, respectively, and each have a slope $-1.0 \times 10^{-4}/°$ C.

Figure 10:
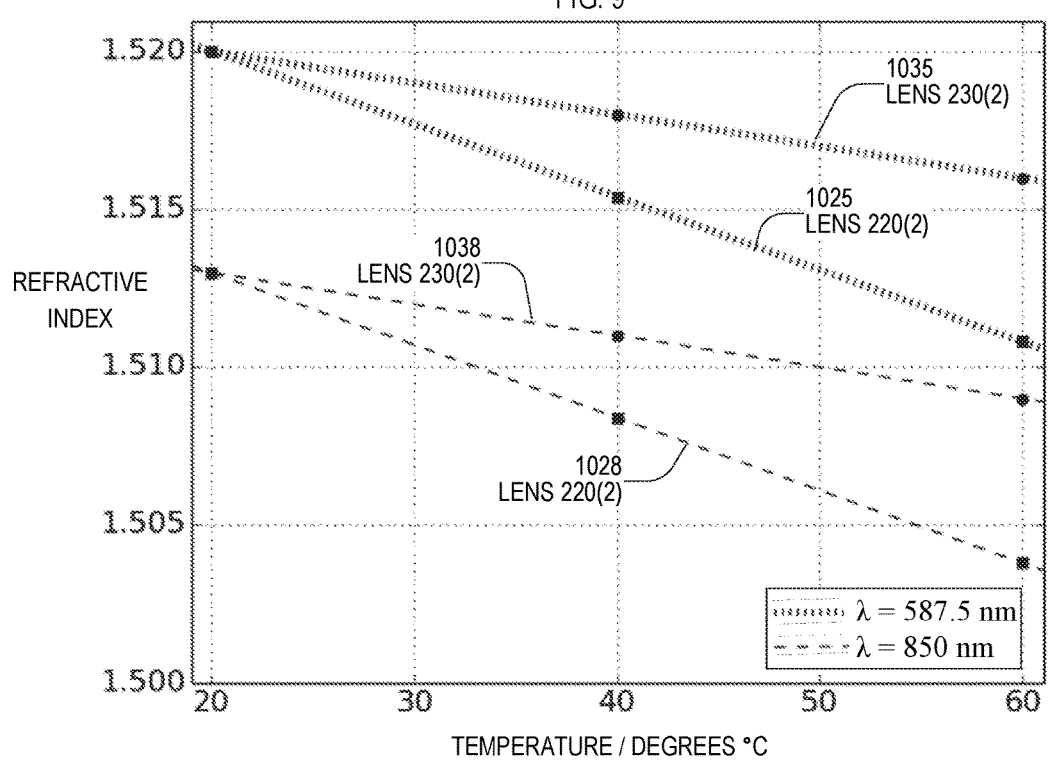
FIG. 10 is a graph showing the refractive-index temperature dependence of two lenses of the lens of FIG. 6.

FIG. 10 is a graph of the refractive indices of lenses 220(2) and 230(2), of athermal compound lens 600, shown in Table 2 fit with linear temperature dependencies 1025, 1028, 1035, and 1038. Linear temperature dependencies 1025 and 1028 correspond to concave lens 220(2) at $\lambda_0=587$ and $\lambda_0=850$ nm, respectively, and each have a slope $-2.3 \times 10^{-4}/°$ C. Linear temperature dependencies 1035 and 1038 correspond to convex lens 220(2) at $\lambda_0=587$ and $\lambda_0=850$ nm, respectively, and each have a slope $-1.0 \times 10^{-4}/°$ C.

Features described above as well as those claimed below may be combined in various ways without departing from the scope hereof. The following examples illustrate some possible, non-limiting combinations:

(A1) An athermal compound lens includes a plano-concave lens and a plano-convex lens. The plano-concave lens has a first focal length, a first refractive index $n_1$, and planar object-side surface opposite a concave image-side surface. The plano-convex lens is axially aligned with the plano-concave lens and has (i) a second focal length, (ii) a second refractive index $n_2$, (iii) a planar image-side surface, and (iv) a convex object-side surface between the planar image-side surface and the concave image-side surface. In a free-space wavelength range and temperature range: (a) the first focal length divided by the second focal length is less than $-0.68$, and (b) first and second refractive indices $n_1$ and $n_2$ have respective temperature dependences $$\frac{\Delta n_1}{\Delta T} \text{ and } \frac{\Delta n_2}{\Delta T}$$

that satisfy $$\left(\frac{\Delta n_1}{\Delta T}\right) / \left(\frac{\Delta n_2}{\Delta T}\right) \geq 2$$

(A2) In the athermal compound lens denoted by (A1), the free-space wavelength range may include wavelengths from 400 nm to 650 nm.

(A3) In any athermal compound lens denoted by one of (A1) and (A2), the free-space wavelength range may include wavelengths from 600 nm and 1,000 nm.

(A4) In any athermal compound lens denoted by one of (A1) through (A3), the temperature range may be from 20° C. to 60° C.

(A5) Any athermal compound lens denoted by (A4) may have a temperature-dependent focal length shift $$\frac{\Delta f}{\Delta T} < 0.15 \; \mu m/°\; C.$$

within the free-space wavelength range and the temperature range.

(A6) In any athermal compound lens denoted by one of (A1) through (A5), $$\left|\frac{\Delta n_1}{\Delta T}\right|$$

may be greater than or equal to $10^{-4}/°$ C. and $$\left|\frac{\Delta n_2}{\Delta T}\right|$$

may be greater than or equal to $0.5 \times 10^{-4}/°$ C.

(A7) In any athermal compound lens denoted by one of (A1) through (A6), the second refractive index may be greater than or equal to the first refractive index.

(A8) Any athermal compound lens denoted by one of (A1) through (A7) may further include a third lens, axially aligned with the plano-convex lens, and having a planar object-side surface, and a biplanar substrate between the plano-convex lens and the third lens.

(A9) In any athermal compound lens denoted by (A8), the third lens may have a convex image-side surface.

(A10) Any athermal compound lens denoted by one of (A8) and (A9) may further include an aperture stop between the third lens and the plano-convex lens.

(A11) In any athermal compound lens denoted by one of (A8) through (A10), the third lens may have a concave image-side surface.

(A12) In any athermal compound lens denoted by one of (A8) through (A11), wherein the plano-convex lens is formed of a first material and the third lens is formed of a third material, the first material may differ from the third material.

(A13) Any athermal compound lens denoted by one of (A1) through (A12) may further include a fourth lens, axially aligned with the plano-concave lens, and having a planar image-side surface, and a second biplanar substrate between the plano-concave lens and the fourth lens.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An athermal compound lens comprising:
    a plano-concave lens having (i) a first focal length, (ii) a first refractive index $n_1$, and (iii) a planar object-side surface opposite a concave image-side surface; and
    a plano-convex lens axially aligned with the plano-concave lens and having (i) a second focal length, (ii) a second refractive index $n_2$, (iii) a planar image-side surface, and (iv) a convex object-side surface between the planar image-side surface and the concave image-side surface,
    in a free-space wavelength range and temperature range: (a) the first focal length divided by the second focal length being less than 0.68, and (b) first and second refractive indices $n_1$ and $n_2$ having respective temperature dependences $$\frac{\Delta n_1}{\Delta T} \text{ and } \frac{\Delta n_2}{\Delta T}$$

that satisfy $$\left(\frac{\Delta n_1}{\Delta T}\right) / \left(\frac{\Delta n_2}{\Delta T}\right) \geq 2,$$

$$\left|\frac{\Delta n_1}{\Delta T}\right| \geq 10^{-4}/° \text{ C., and } \left|\frac{\Delta n_2}{\Delta T}\right| \geq 0.5 \times 10^{-4}/° \text{ C.}$$

2. The athermal compound lens of claim 1, the free-space wavelength range including wavelengths from 400 nm to 650 nm.

3. The athermal compound lens of claim 1, the free-space wavelength range including wavelengths from 600 nm to 1,000 nm.

4. The athermal compound lens of claim 3, having a temperature-dependent focal length shift $$\frac{\Delta f}{\Delta T} < 0.15 \text{ } \mu\text{m}/° \text{ C.}$$

within the free-space wavelength range and the temperature range.

5. The athermal compound lens of claim 1, the temperature range being from 20° C. to 60° C.

6. The athermal compound lens of claim 1, the second refractive index being greater than or equal to the first refractive index.

7. The athermal compound lens of claim 1, further comprising:
    a third lens, axially aligned with the plano-convex lens, and having a planar object-side surface; and
    a biplanar substrate between the plano-convex lens and the third lens.

8. The athermal compound lens of claim 7, the third lens having a convex image-side surface.

9. The athermal compound lens of claim 7, further comprising an aperture stop between the third lens and the plano-convex lens.

10. The athermal compound lens of claim 7, the third lens having a concave image-side surface.

11. The athermal compound lens of claim 7, the plano-convex lens comprising a different material from the third lens.

12. The athermal compound lens of claim 1, further comprising:
    a fourth lens, axially aligned with the plano-concave lens, and having a planar image-side surface; and
    a second biplanar substrate between the plano-concave lens and the fourth lens.

* * * * *